Figure 1:
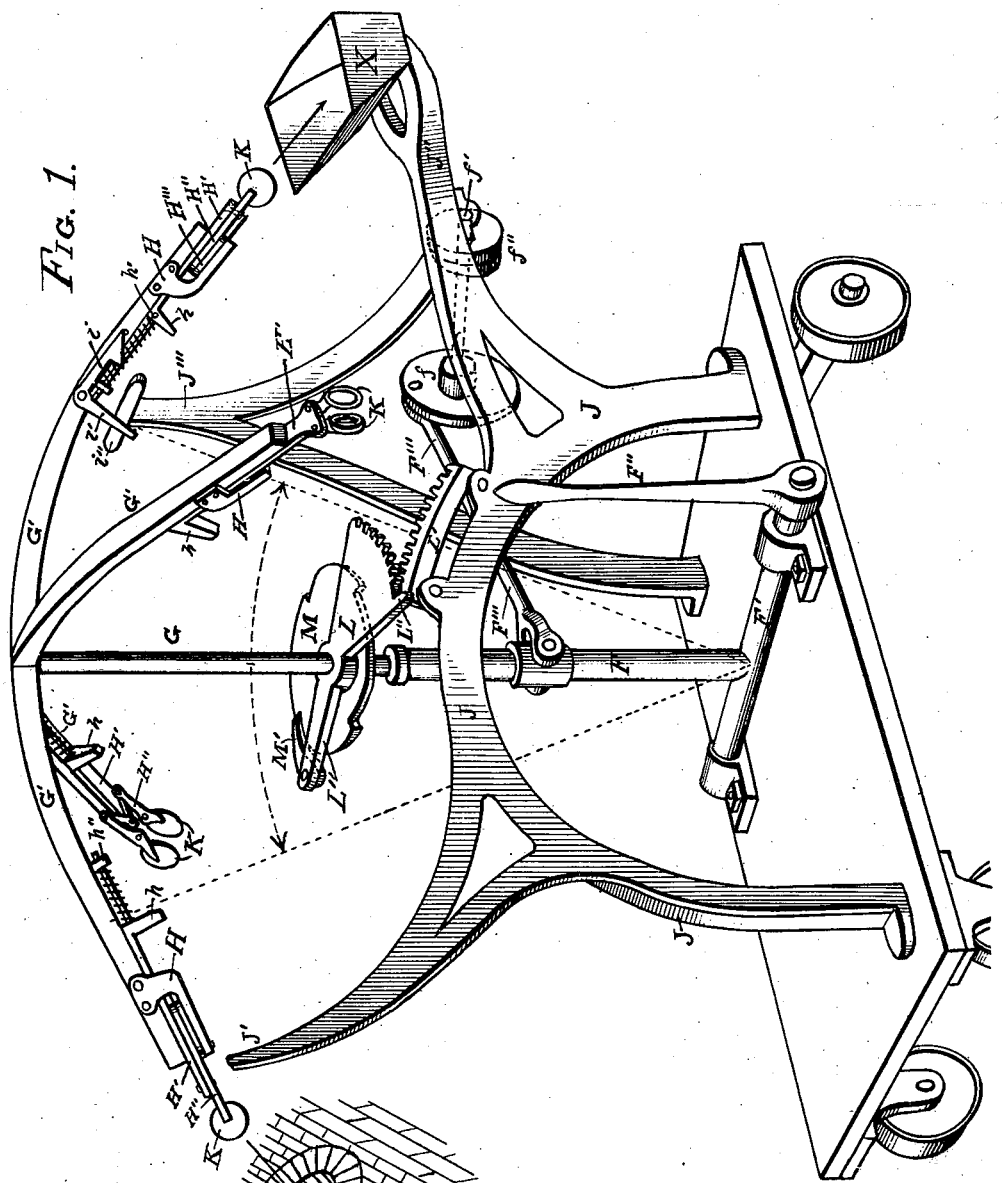

No. 617,818. Patented Jan. 17, 1899.
W. E. SMITH.
METHOD OF AND APPARATUS FOR DIPPING, MEASURING, AND TRANSFERRING MOLTEN GLASS FROM TANKS TO MOLDS.
(Application filed Oct. 29, 1898.)
(No Model.) 4 Sheets—Sheet 1.

No. 617,818. Patented Jan. 17, 1899.
W. E. SMITH.
METHOD OF AND APPARATUS FOR DIPPING, MEASURING, AND TRANSFERRING MOLTEN GLASS FROM TANKS TO MOLDS.
(Application filed Oct. 29, 1898.)
(No Model.) 4 Sheets—Sheet 3.

No. 617,818. Patented Jan. 17, 1899.
W. E. SMITH.
METHOD OF AND APPARATUS FOR DIPPING, MEASURING, AND TRANSFERRING MOLTEN GLASS FROM TANKS TO MOLDS.
(Application filed Oct. 29, 1898.)

(No Model.) 4 Sheets—Sheet 4.

WITNESSES
Wm Dorsey
Geo. W. Wilson

INVENTOR
Wm E. Smith

UNITED STATES PATENT OFFICE.

WILLIAM ED. SMITH, OF BALTIMORE, MARYLAND, ASSIGNOR TO JAMES J. PURMAN, OF WASHINGTON, DISTRICT OF COLUMBIA.

METHOD OF AND APPARATUS FOR DIPPING, MEASURING, AND TRANSFERRING MOLTEN GLASS FROM TANKS TO MOLDS.

SPECIFICATION forming part of Letters Patent No. 617,818, dated January 17, 1899.

Application filed October 29, 1898. Serial No. 694,975. (No model.)

*To all whom it may concern:*

Be it known that I, WILLIAM ED. SMITH, a citizen of the United States, residing at Baltimore, Maryland, have invented a new and useful Method of and Apparatus for Dipping, Measuring, and Transferring Molten Glass from Tanks to Molds, of which the following is a specification, reference being had to the accompanying drawings, which form a part thereof.

The object of my invention is to produce a machine to do the work heretofore done by a skilled man called the "gatherer" in the practice of producing pressed glassware and for supplying or feeding machines of recent introduction which produce articles, as bottles, jars, &c., by combined pressing and blowing.

By my machine a pair of dippers or ladles inclose and cut off from the molten glass in the tank or pot an exact measured amount of glass just sufficient for a glass article, withdraw this from the tank, swing it around one-quarter revolution, and drop it into a glass-mold located to receive it.

The advantages of my invention over the previous state of the art are that it is an "iron man;" that he "gathers" glass always in exactly the same quantity required, with no guesswork or eye measurement; that there is no waste to be cleaned from a punty-rod, all surplus being left in the tank; that he can work as regular as clockwork or irregular, as desired; that he is a man upon one leg, with four arms, eight hands, no body, no head, eats nothing, doesn't get sick nor drunk, doesn't swear at his fellow-workman, doesn't grumble about capital, doesn't go on strikes, never tires, works day or night, works day and night, and does his work quietly and with a regularity, a rapidity, an exactness, and perfection that no bones and muscle have ever heretofore been able to accomplish.

My invention consists in the general construction and method of operation, together with the numerous details shown and set forth in the following specification and defined in the annexed claims.

Figure 2:
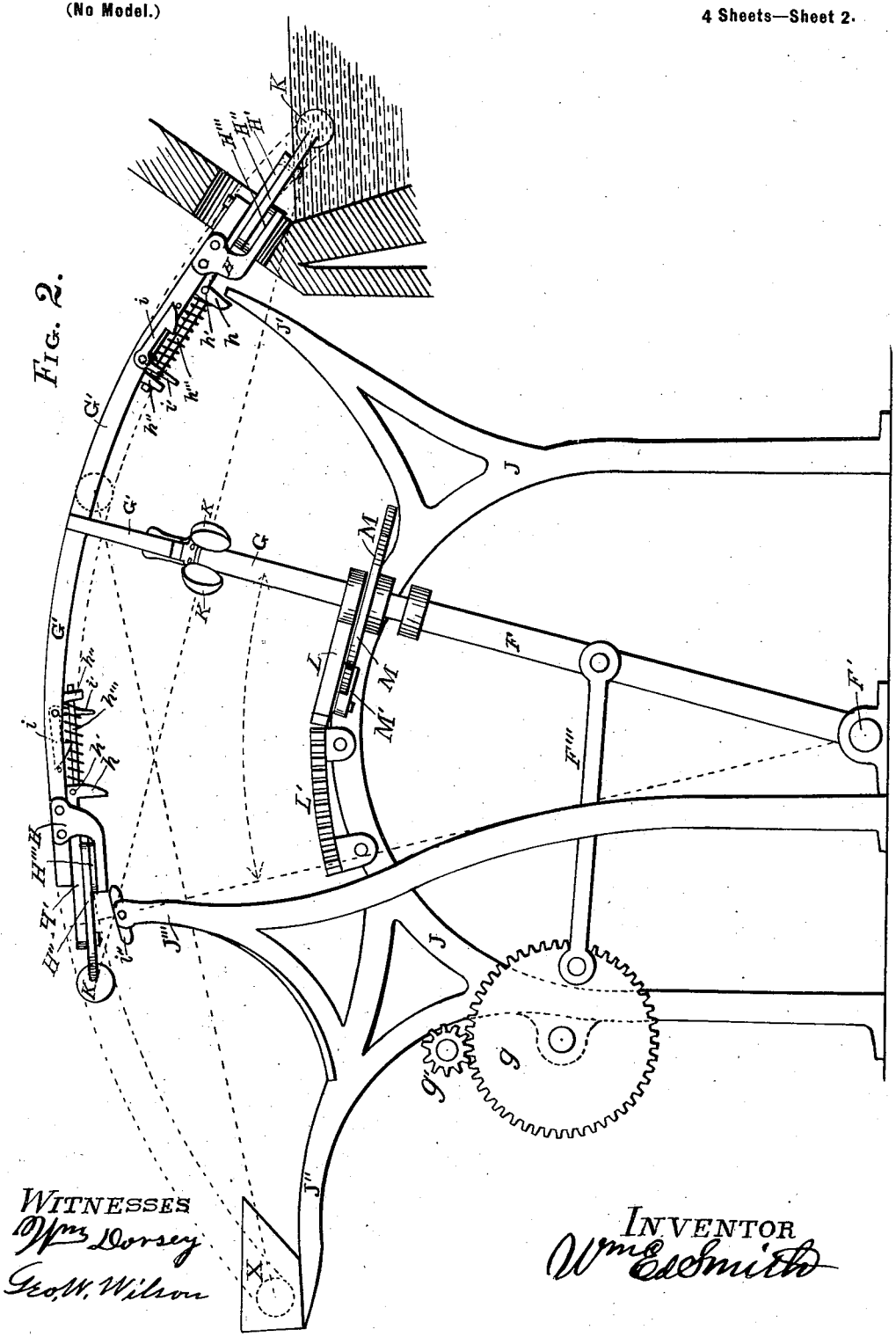
Figure 3:
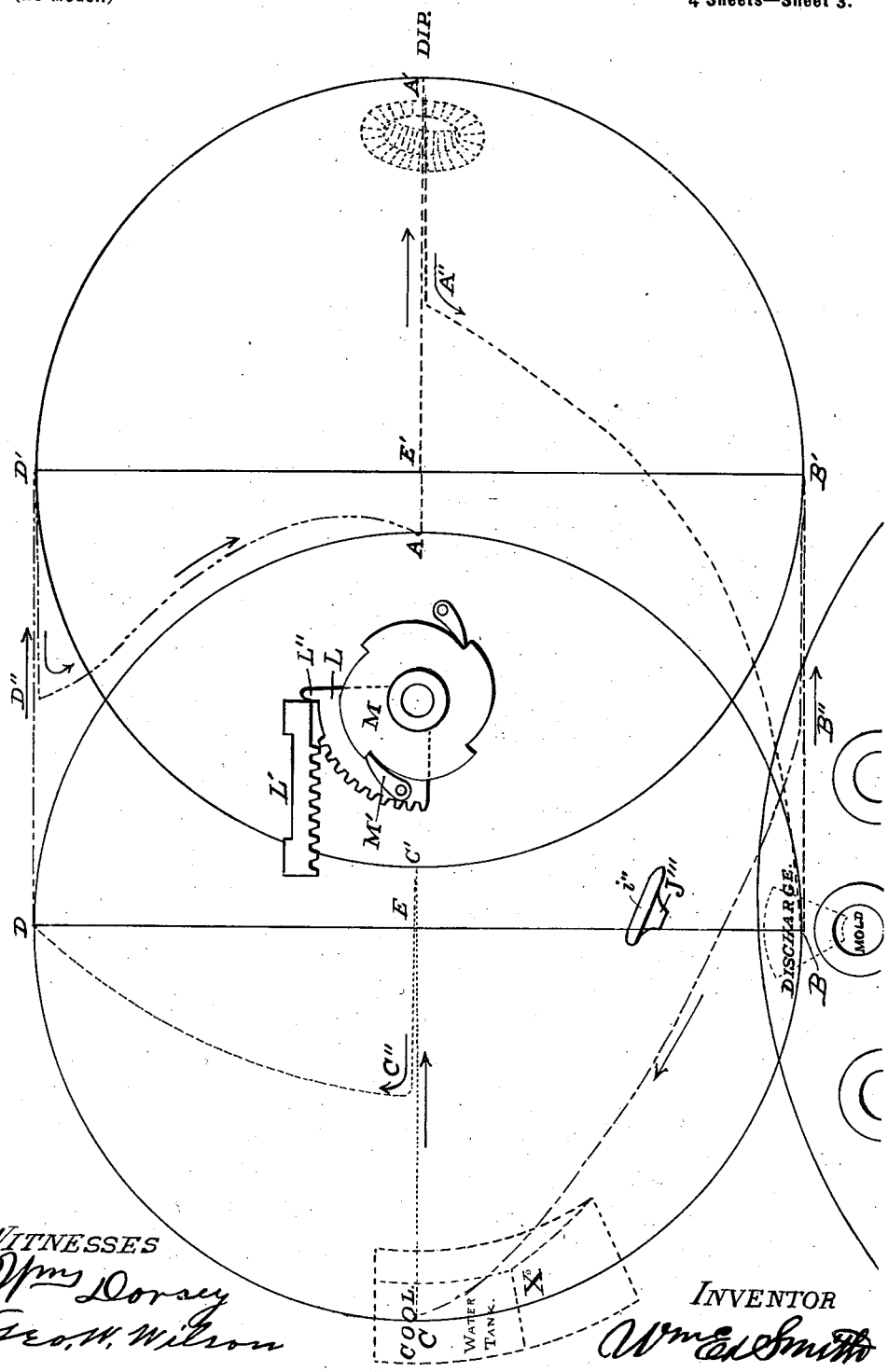
Figure 4:
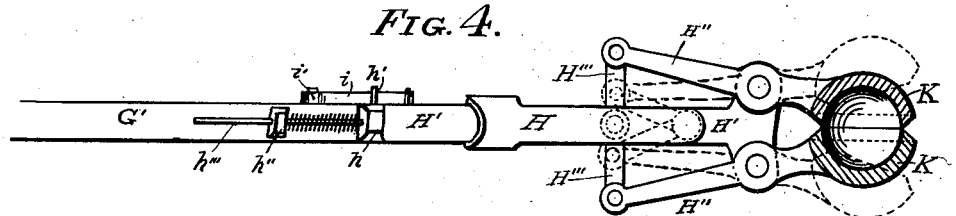
Figure 5:
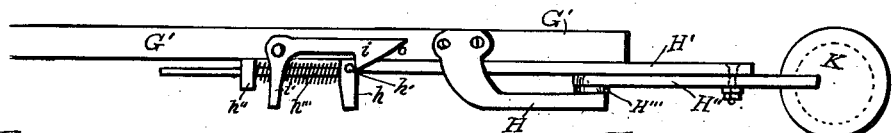
Figure 6:
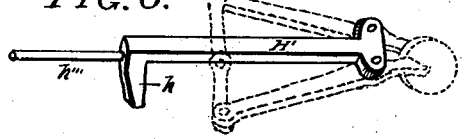
Figure 7:
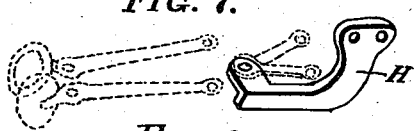
Figures 8, 9:
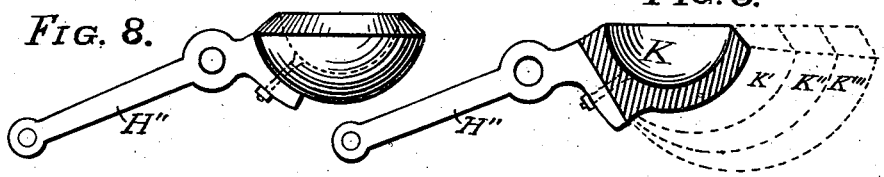
Figure 10:
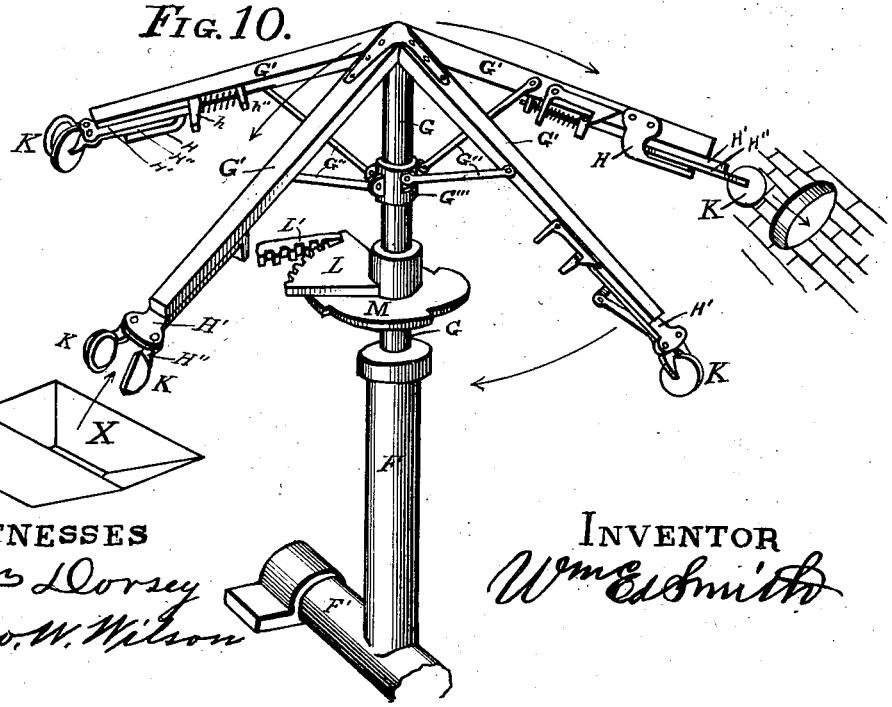

In the drawings, in which like letters show like parts in all the views, Figure 1 shows a perspective view of a machine embodying my invention. Fig. 2 is the machine in elevation viewed from the other side. Fig. 3 is a diagrammatic plan view showing the various movements and relative location of the different parts. Fig. 4 shows an enlarged bottom plan view of the outer end of one of the swing-arms G'. Fig. 5 shows the same in side elevation. Fig. 6 shows a detail view of one of the sliding plates that carries the dipping-ladles. Fig. 7 shows a detached view of a bracket which connects the swinging arm with links for operating the ladles below the sliding plate. Fig. 8 is a detached side view of one of the ladles with a detachable handle secured thereto. Fig. 9 is a similar view, but with the ladle in vertical section and with dotted lines showing various different sizes of ladles attachable to the same handle. Fig. 10 is a perspective view of a machine modified in some of its details.

The machine consists of an upright hollow arm or pipe F, fixed to a pivoted base F', in suitable bearings upon which the upright F is free to oscillate in a vertical plane to and from the positions indicated by inclined dotted lines at each side of it in Fig. 1 and upon the left in Fig. 2 or from points E to E' in Fig. 3. Set within the hollow upright F is the shaft G, free to rotate within F and oscillated in the vertical plane with F. From the top of shaft G extend four arms G', like the arms of an umbrella, and which revolve with the upright G, carrying the dipping-ladles K upon their outer ends from one position to another.

The machine is placed near enough to a tank-furnace for the end of the arm G' carrying the ladles K to enter a working hole to the tank (shown upon the left of Fig. 1 and upon the right of Figs. 2 and 3) when the upright F and G is swung to the right, as shown in Fig. 2, thus dipping the ladles K into the molten glass in the tank, as shown in Fig. 2. When the uprights are swung to the opposite extreme, the ladles are withdrawn from the furnace and the ladles upon the opposite side are dipped into the water-tank X to cool them.

This oscillation of the uprights F and G and all the parts carried thereby may be effected in any one of many different ways—e. g., for light work in making small articles of pressed or pressed and blown glass articles the machine may be operated by hand by the hand-lever F''', (shown in Fig. 1,) or it may be driven from line-shafting or other source of power through the common fast and loose pulleys $f'''$ on shaft $f'$, carrying crank-wheel $f$ and pitmen F'''', Fig. 1; or spur-gears $g\ g'$, Fig. 2, may be used, or any other arrangement preferred that will give an oscillating movement to the working parts of the machine. These are among the immaterial details, and I do not limit my invention to the particular arrangements here shown.

I will now describe the several movements of the ladles that are preferred in operating my machine, referring particularly to Fig. 3. The two large circles represent the course of travel of the ladles if they were revolved clear around the two centers E E', which represent the extreme end movements of the oscillations of the top of the shaft G. I will trace the real movement of each pair of ladles in turn. Beginning with the ladles located at point A the oscillation will carry them through the vertical plane to and into the furnace at A', where by mechanism hereinafter explained they are closed and locked full of glass. The return oscillation carries the filled ladles back from A' to a point A'', where the sectional spur-gear or sector L on shaft G comes in contact with the stationary fixed rack L', stops the further free movement of the sector L, and causes it to roll in gear with the rack L'. The sector L is loosely mounted on shaft G, but the circular notched plate M is rigidly fixed to the shaft G, so that the pawl M', attached to the rolling sector L, engages the fixed plate M, causing it to rotate with the sector one-quarter revolution, and the plate M, being fast to shaft G, causes the latter and the arms and ladles to revolve one-fourth revolution during the continuance of the backward oscillation of G and G'. This, then, arrests the direct backward movement of the ladles at A'', causing them to be deflected from that point, and the combined oscillating and rotary movement causes them to follow the course of the dotted curved line to the point B, where a device automatically unlocks and opens the ladles, permitting their contents to drop out and pass down into a glass-mold, which is preferably one of a series of molds mounted upon the intermittently-rotating mold-table of a glass-working machine, which may be either simply a glass-press or a machine for combined pressing and blowing. For either of such machines it is preferable to have connected gear (not shown) for causing my machine and the pressing-machine to have automatic synchronous movement, so that a fresh glass-mold will arrive at the pressing-point at the same time or just preceding the arrival there and discharge of the ladleful of glass, so that the operation of both machines is continuous and no time lost in one part waiting upon another part and to require as little attention as possible upon the part of the attendant. For expeditious work the rotary table should carry six to ten molds to give proper time for cooling, and a rotary plunger-head carrying several plungers should be used for the same reason.

While the ladles are being carried from the point A to A', filled and returned to A'', then by curved line to B and discharged, the empty ladles that were located at B are carried forward to point B', then directly back to B'', thence, partaking also of the rotary movement, are carried on a curved line from B'' to and into the cooling water-tank at C, where the surplus heat is extracted from the ladles ready for the next filling. This water-tank has one end and one side made with long slopes to permit the ladles to swing into it along the downwardly-inclined curve. The ladles in the water-tank at C move out directly to the point C', thence back to C'', thence upon a curve line to D. The ladles at D move direct to D', thence back to D'', thence by a compound curve to the point A. After these several movements just described, by which the arms G' and ladles have all been turned one-fourth of a revolution, the return oscillation of F and G causes the cogged sector L to roll back again in mesh with the cogged rack L' until it passes out of gear with the rack and away from it. This rolling back of the sector does not cause any rotation of the arms G', because the sector is loose upon the shaft G and it can turn the shaft G only when it moves in the opposite direction, so that its pawl M' engages with one of the notches in the ratchet-plate M, which is rigidly secured to the shaft G, while on the return movement the pawl M' slides back freely over the edge of the plate M and catches into another notch in it ready to move it one-fourth revolution in the opposite direction during the next oscillation of the shaft G, thus always rotating the arms and ladles one-fourth revolution in the same direction while the filled ladles are being withdrawn from the furnace or tank and producing no revolution while the empty ladles are being moved toward the tank. The sector L and rack L' are preferably made without cogs at one end and with a long cog L'', Fig. 3, that comes against the end of the rack L' and guides the other cogs into proper mesh.

It will be observed that the ladles have a different and peculiar movement from each of the four starting-points, that each pair of ladles dip glass but once in each four movements, and that each pair of ladles is cooled once in the four separate movements.

The ladles are made, preferably, with hemispherical cavities, as shown in section in Figs. 4 and 9, always two ladles closing together, as shown in Fig. 4, to form a spherical cavity, a gob of spherical form having less surface in proportion to its mass than other forms and is therefore less chilled by contact with the metal of the ladles.

The ladles should be so formed that they will have no flat surfaces to come in contact to catch glass between them which would be pinched into a thin skin and chill, forming a connecting-fin between that within and that without the ladle and draw threads from the glass. To prevent this and to get a clean cut-off, I bevel the edges of the ladles, as shown in the drawings, so that a sharp edge or corner comes against a corresponding edge which will entirely sever the glass and form no chilled scales or fins.

The ladles may be made integral with the levers H″ or may be separate and bolted to the levers, as shown in Figs. 8 and 9. By making the bowls separate different sizes may be used interchangeably on the same levers, as shown by dotted lines K′ K″ K‴, Fig. 9, and thus change the machine for supplying glass for different-sized articles by only changing one size of bowls or dippers for another size suited to the articles required. In this way the same machine may be adapted for almost any size of glass articles. If the lever and bowl are integral, both together are removed to substitute others of larger or smaller sizes. The ladles are preferably made of copper, bronze, brass, or aluminium.

The ladle-levers H″ are pivoted to the end of a plate H′. The back ends of the levers H″ have links H‴ pivoted to them, the other ends of the links being pivoted to the bottom end of the bracket H, which is rigidly secured to the swinging arm G′, while the plate H′ is secured to the under side of G′, so that it can slide endwise on G′, the plate H′ having slots and bolts or stirrups to secure it to the under side of the arm G′. A longitudinal sliding of the plate H′ on the arm G′ thus causes the opening and closing of the ladles through the links H‴, which have connection to the arms G′ at one end, while their other ends are connected through the levers H″ to the sliding plate H′. The operation of these parts is as follows: The back end of the plate H′ has a rod h‴ projecting from it through the lug h″ in the arm G′. Around this rod h‴ is a spiral spring, which, pressing against the lugs h″ and h, causes the plate H′ to be normally thrust out from the end of G′ to the limit of its throw, which causes the levers H″ and links H‴ to assume the position shown by dotted lines in Fig. 4, the ladles being thrown apart, as shown there also in dotted lines. With the ladles thus open they enter the molten glass. Before the arm G′ quite reaches the limit of its outward movement the lug h, rigidly connected with the plate H′, comes in contact with a fixed stop J′, connected with the frame of the machine or otherwise relatively fixed. The further movement of the arm G′ then causes the plate H′ to slide on the arm G′ by this contact with the stop J′, and this sliding of plate H′ brings the inner ends of the links H‴ into the straight line crosswise of the arm, as shown in full lines in Fig. 4, which closes the ladles within the glass, thus filling them and cutting off the surplus. The parting of the ladles is placed vertical to permit the free escape from the ladles of all air as they enter the glass. When the plate H′ has slid back and closed the ladles, a hook $i$ on arm G′ drops over the pin $h′$ in $h$, thus holding the ladles locked shut until released, which is done when the ladles have been carried around to the discharge-point by the lug $i′$, attached to the hook $i$, coming in contact with the stop $i″$, fixed upon the projection J‴. The lug $i′$, depending from the hook $i$, slides over the inclined face of the stop $i″$, which presses $i′$ to one side as it passes, thus lifting the hook $i$ off the pin $h′$, when the compressed spring on $h‴$ thrusts the plate H′ outward, and thus opens the ladles and drops their contents into a mold. They then remain open during the other three-fourths of their travel, which is best for cooling and for reëntering the molten glass.

The several working parts may be supported upon any suitable frame, as that shown at J, (or otherwise,) having a projection J′ to serve as a stop for closing and locking the ladles shut, a projection J‴ holding a tripping-plate $i″$ for unlocking and opening the ladles, and a projection J″ for supporting a cooling water-tank in proper position.

I am aware that it has recently been proposed to use machines for rotating and handling a punty much as it is done by the old hand-gathering, then clipping off with handshears a guessed-at amount of the gather for each article; but this still requires the use of a punty-rod and generally a man to handle it and a man to cut off the glass as in hand-gathering; but in my machine no punty is used and no cutting off from it, no guessing at the amount to be cut off, and the machine, if suitably driven by power, requires no handling of anything connected with it by an attendant—it takes the place of the gatherer. Furthermore, it will dip glass a little hotter and softer than can be gathered, so that it can go into the mold, if desired, softer than if gathered, so that it will require less pressure to perfectly fill out all fine details of the design in the mold; but my machine is the first one made or proposed in which the molten glass is dipped and cut off in measured uniform amounts required and passed to the molds without a punty, and all this is done automatically.

As my ladles are thrust in open and can be almost instantly closed they can be withdrawn much quicker than a rod can be rotated and a proper gathering be formed on it, and the automatic discharge is also quicker than glass can be cut off from a punty in approximately proper amount with shears, so that my machine can furnish gobs of glass much faster than can be done by the old method, probably faster than any single press could press them. If so, the alternate arms on my machine can easily be arranged to contact with an additional discharge-knocker $i''$, placed to hit alternate projections $i$ and discharge its contents a little sooner into a conveyer, which will deliver it to a second press or machine.

It is obvious that various different methods of securing the ladles to a suitable support and that various means of closing and opening the ladles automatically or by hand may be used, and I do not limit myself to the means shown. It is necessary that the pair of ladles to be so mounted that their cutting edges will register with each other when closed, and it is preferable that the ladles be thrust into the glass while open and that they be closed while within the glass and be immediately withdrawn and the contents passed to and dropped into a glass-mold. The ladles are made with rather thick walls, and when so operated they will never become hot enough for the glass to stick to them and refuse to dump out freely and rapidly.

What I claim is—

1. The method of working glass which consists in dipping and forming a predetermined quantity of molten glass into a compact form, cutting off and transferring the same from the mass of glass, then further forming the glass while still plastic into a finished glass article, substantially as set forth.

2. The method of working glass which consists in dipping and cutting off from a molten mass of glass a predetermined measured quantity thereof, transferring the same from the mass of glass, then further forming the separated measured mass into a finished glass article while still plastic, substantially as set forth.

3. The method of working glass which consists in dipping and cutting off a predetermined measured quantity of glass from a molten mass thereof, transferring the same therefrom, then forming the same into a finished glass article while still plastic by pressing and blowing, substantially as set forth.

4. In a glass-working machine an oscillating upright carrying a rotary shaft, oscillating with the upright, the rotary shaft being provided with laterally-swinging arms which carry glass-dipping ladles upon their outer ends, substantially as set forth.

5. A glass-working machine comprising laterally-projecting arms carried by a central rotary shaft, said shaft being carried by an upright support which is adapted to oscillate in a vertical plane, the arms being provided with glass-dipping ladles, as set forth.

6. A glass dipping and delivering machine comprising dipping-ladles on swinging oscillating arms carried by a rotary shaft mounted in an oscillating upright, substantially as set forth.

7. A glass dipping and delivering machine consisting of dippers mounted upon arms radiating from a center around which the arms revolve and which center oscillates in a vertical plane, thus imparting a revolving and an oscillating movement to the arms and dippers, substantially as set forth.

8. In a glass dipping and delivering machine, the combination of an upright F adapted to be oscillated upon its support and carrying a rotary shaft G provided with arms G', the arms being provided with means for dipping and delivering molten glass from a glass-tank to a glass-mold, substantially as set forth.

9. In a glass dipping and delivering machine, the combination of a rotary shaft G mounted in an oscillating support F, the shaft G being provided with arms G' and dipping-ladles K, a notched circular plate or ratchet M fixed rigidly to the shaft G a loose sector L thereon having pawl M' to engage with the ratchet, a cogged periphery on the sector adapted to engage with a fixed rack L', substantially as set forth.

10. In a glass dipping, measuring and delivering machine the combination of a pair of ladles provided with suitable handles or levers pivoted to a swinging oscillating support with mechanism for opening and closing the ladles, substantially as set forth.

11. Glass-dipping ladles having thick metal bowls attached to suitable operating handles or levers, the thick edges of the bowls of the ladles being more or less beveled to form cutting edges, substantially as set forth.

WM. ED. SMITH.

Witnesses:
WM. DORSEY,
GEO. W. WILSON.